United States Patent [19]

Romann

[11] 4,338,814
[45] Jul. 13, 1982

[54] DEVICE FOR MEASURING THE MASS OF A FLOWING MEDIUM

[75] Inventor: Peter Romann, Stuttgart, Fed. Rep. of Germany

[73] Assignee: Robert Bosch GmbH, Stuttgart, Fed. Rep. of Germany

[21] Appl. No.: 200,722

[22] Filed: Oct. 27, 1980

[30] Foreign Application Priority Data

Nov. 28, 1979 [DE] Fed. Rep. of Germany ....... 2947856

[51] Int. Cl.³ .............................................. G01F 1/68
[52] U.S. Cl. ......................................... 73/118; 73/204
[58] Field of Search .................................. 73/118, 204

[56] References Cited

U.S. PATENT DOCUMENTS

| | | | |
|---|---|---|---|
| 2,652,721 | 9/1953 | McMillian et al. | 73/204 X |
| 4,109,510 | 8/1978 | Rodder | 73/204 |
| 4,213,335 | 7/1980 | Peter et al. | 73/204 |
| 4,252,016 | 2/1981 | Saver et al. | 73/204 |

FOREIGN PATENT DOCUMENTS 2809455 9/1979 Fed. Rep. of Germany ........ 73/204

Primary Examiner—Herbert Goldstein
Attorney, Agent, or Firm—Edwin E. Greigg

[57] ABSTRACT

An apparatus for measuring the mass of a flowing medium, especially for measuring the aspirated air mass in internal combustion engines, which has a temperature-dependent resistor disposed in the path of a flowing medium, whose temperature and/or resistance is controlled in closed-loop fashion in accordance with the mass of the medium, with the control variable being a standard for the mass of the medium. The temperature-dependent resistor is embodied as a hot band and guided over at least three support points in the form of a loop. The band portions of the loop extending away from the intermediate support point are then connected with one another in an electrically conductive manner at a contact area. The hot band is disposed in the flowing medium in such a manner that one of the narrow faces performs as an exposed face of the hot band disposed counter to the flow direction, while the wide faces extend substantially in the flow direction.

9 Claims, 4 Drawing Figures

DEVICE FOR MEASURING THE MASS OF A FLOWING MEDIUM

CROSS REFERENCE TO RELATED APPLICATIONS

This application is an improvement and departure from the inventions found disclosed and claimed in the following applications:

| Applicants(s) | Application Set No. | Filed | U.S. Pat. No. |
|---|---|---|---|
| Hafner & Romann | 136,659 | Apr. 2, 80 | — |
| Hafner & Romann | 15,994 | Feb. 28, 80 | — |
| Hafner & Romann | 83,696 | Oct. 11, 1979 | — |
| Knapp | 64,265 | Aug. 6, 1979 | — |
| Peter | 944,587 | Sept. 21, 1978 | 4,196,622 |
| Sauer et al | 42,258 | May 24, 1979 | — |

BRIEF SUMMARY OF THE INVENTION

The invention relates to devices for measuring the mass of a flowing medium as described in the main claim.

BACKGROUND OF THE INVENTION

A device for measuring the mass of a flowing medium is already known in which a hot wire is used as a temperature-dependent resistor, the hot wire being stretched substantially tautly over a plurality of support points within a sensor ring. Because of varying temperatures and soiling, particularly when the device is used in a motor vehicle, there is the danger of wire breakage as a result of the particular mode of operation of the hot wire. There is also the disadvantage that an irregular condition of heat away from the hot wire via the support points causes an undesirable impairment in the precision measurement of the device.

OBJECT AND SUMMARY OF THE INVENTION

The device according to the invention has the advantage over the prior art in that temperature changes, especially in the case where the device is used in a motor vehicle, and temperature changes brought about by the mode of operation of the hot wire do not cause errors or imprecision in measurement. In guiding the hot band over at least one support point disposed between the terminal support points and embodied in the form of a loop, and given the electrical connection provided between the band sections which contact one another, care is taken that the hot band is free of electric current at this intermediate support point. A further advantage, in the event that the hot band may lift up somewhat or slip at the support point located between the terminal support points as a result of temperature-induced expansion, is that this event is not critical, because it does not change the effective length of the hot band. The total active length of the hot band is also disposed outside the region of the sensor ring located in the vicinity of the wall, where flow relationships are difficult to detect, so that imprecisions in measurements which would occur in the vicinity of the wall are also avoided. In addition, more favorable conditions are provided for a complete burn-off of deposits on the hot band during a glow-heating procedure. Furthermore, embodying the temperature-dependent resistor as a hot band provides the advantage of reduced vulnerability to soiling, thus keeping the characteristic curve of the measuring sensor constant over a long period.

As a result of the characteristics disclosed in the dependent claims, advantageous modifications of and improvements to the device disclosed in the main claim are attained.

The invention will be better understood and further objects and advantages thereof will become more apparent from the ensuing detailed description of a preferred embodiment taken in conjunction with the drawings.

DETAILED DESCRIPTION OF THE PREFERRED EMBODIMENT

Figure 1:
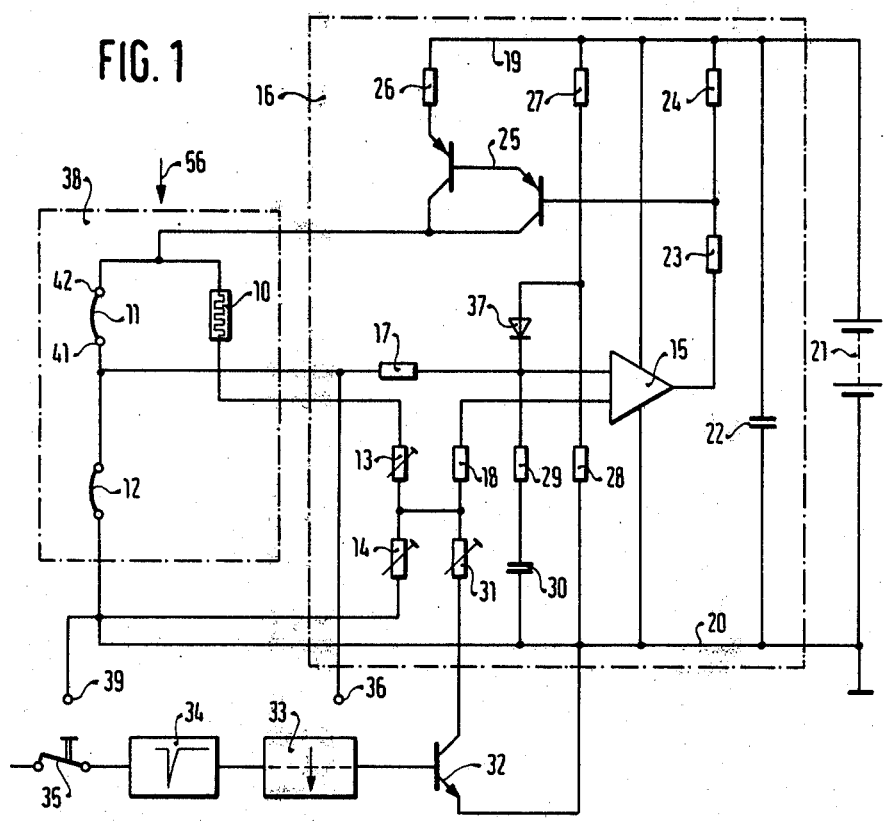
FIG. 1 is a schematic circuit diagram of a device for measuring the mass of a flowing medium, in particular for measuring the mass of aspirated air in internal combustion engines.

In referring to the drawings there is shown a device for measuring the mass of a flowing medium in FIG. 1, which is intended in particular for measuring the aspirated air in internal combustion engines. A bridge circuit is provided which is made up of a temperature-dependent resistor 10, a temperature-dependent resistor 11, a resistor 12 and resistors 13 and 14. A control amplifier 15 for a closed-loop control apparatus 16 is connected to the diagonal of the bridge circuit. The inverting input of the control amplifier 15 is connected via an input resistor 17 with the junction of the resistors 11 and 12, while the non-inverting input of the control amplifier 15 is connected via an input resistor 18 to the junction of resistors 13 and 14. The control amplifier 15 is connected via two supply lines 19 and 20 with a source of direct current 21. This direct-current source 21 is switched in parallel with a smoothing capacitor 22. The output of the control amplifier 15 is connected with the series circuit comprising two resistors 23 and 24, with the resistor 24 being connected to the common supply line 19. These two resistors 23 and 24 represent a voltage divider for a Darlington circuit 25, which together with a resistor 26 forms a voltage-controlled current source for supplying the bridge circuit made up of resistors 10, 11, 12, 13 and 14 with electric current. A voltage divider comprising the resistors 27 and 28 is switched between the common supply lines 19 and 20. The anode of a diode 37 is connected to the junction of the two resistors 27 and 28, and the cathode of this diode 37 is connected with the inverting input of the control amplifier 15. The series circuit comprising a resistor 29 and a capacitor 30 is switched between the inverting input of the control amplifier 15 and the common supply line 20; this resistor-capacitor combination serves the purpose of adapting the frequency of the closed control loop to the time behavior of the temperature-dependent resistors.

A resistor 31 is connected to the junction of the resistors 13 and 14 and can be connected with the common supply line 20 via the switching path of a switching transistor 32. The base of the switching transistor 32 is connected with the output of a monostable multivibrator 33, which can be triggered via a differentiation element 34 by an ignition switch, indicated at 35, for the ignition system of the engine or by a pulse furnished by some other means.

The mode of operation of the device described above is as follows:

A predetermined electric current flows over the temperature-dependent resistor 11 of the bridge circuit and heats this resistor 11 up to its normal operating temperature. In another branch of the bridge circuit, the temperature-dependent resistor 10 assumes a resistance value which characterizes the temperature of the flowing medium in question—for instance, the aspirated air of the engine. It is thus attained that the temperature of the aspirated air of an internal combustion engine is always used as a reference signal for the closed-loop control of the heating current of the device for air flow measurement. Depending on the mass of the aspirated air flowing past the resistor, the temperature-dependent resistor 11 is cooled down to a greater or lesser degree. This causes an imbalance in the bridge circuit. The imbalance in the bridge circuit is then regulated in such a manner that the control amplifier furnishes a higher supply current for the bridge circuit via the voltage-controlled current source 23, 24, 25 and 26; thus the temperature of the temperature-dependent resistor 11 and accordingly its resistance value are kept at a value which is at least approximately constant. The current flowing through the bridge circuit represents a standard for the air mass flowing in the direction of the arrow 56 past the temperature-dependent resistor 11. An electrical signal corresponding to this can be picked up between a terminal 36 and a terminal 39.

In order to make the start-up of the closed-loop control device easier, the voltage divider 27, 28 is provided, which has the diode 37. When the control device is switched on, a voltage of approximately 0.5 volts is brought about at the inverting input of the control amplifier 15, which permits reliable starting up of the control device. During normal operation, however, the voltage at the inverting input of the control amplifier 15 will be substantially higher than this initial voltage, so that the diode 37 is blocked and thus the voltage divider 27, 28 can have no influence on the control procedures.

In order from time to time to remove deposits from the surface of the temperature-dependent resistor 11, which is embodied as a hot band and will be referred to as such below, an increased current is intended to flow over this temperature-dependent resistor 11 after a predetermined measurement cycle. In order to serve as this measurement cycle, a predetermined duration of engine operation may be selected by way of example. The glow-heating procedure may also be triggered upon each shutoff of the engine ignition system. This occurs when the ignition switch 35 is shut off. The corresponding signal is differentiated and directs the monostable multivibrator 33 to assume its unstable switching state. During this unstable switching state of the monostable multivibrator 33, the switching transistor 32 becomes conductive and switches the resistor 31 in parallel with the resistor 14 of the bridge circuit. As a result, the bridge circuit comprising the resistors 10, 11, 12, 13 and 14 becomes severely imbalanced, so that the control amplifier 15 furnishes an increased current to the bridge circuit in order to overcome this imbalance. This increased current heats the temperature-dependent resistor 11 for the duration of the unstable switching state of the monostable multivibrator 33 to a temperature above the normal operating temperature, so that deposits on the surface of the temperature-dependent resistor are burned off.

It has proved to be particularly useful for the temperature-dependent resistor 11 to be made from a structurally stabilized platinum band, because this material is particularly well suited to being heated up to high temperatures. This is especially important for the burn-off procedure.

The reference resistor 12 is likewise housed in an efficient manner in the flow cross section indicated by a broken line 38, for instance the intake tube of the engine, because then the lost heat of the reference resistor 12 can be carried away by the air flowing in the direction of the arrow 56. The resistors 13 and 14 are embodied in a useful fashion as adjustable resistors, so that the temperature behavior of the control loop can be adjusted.

Figure 2:
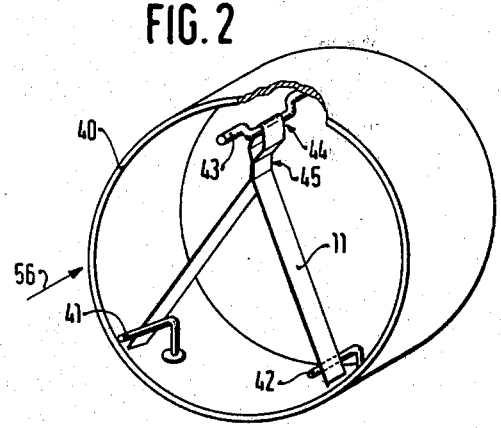
FIG. 2 is a schematic illustration in perspective view of a hot band embodied in "V" form which is guided by at least three support points.

FIG. 2 shows in schematic fashion a sensor ring 40, which may naturally also have some different useful shape, having at least three support points 41, 42 and 43 extending substantially parallel to one another. With the aid of the support points 41, 42 and 43 the temperature-dependent resistor 11 embodied as a so-called hot band 11 is held in place in the form of a V. The hot band 11 is secured with its ends on the two terminal support points 41 and 42 only, for instance by welding or soldering, being only loosely guided over the support point 43. The hot band 11 is preferably secured on the terminal support points 41, 42 in a manner which is linearly parallel to the support points, so that the hot band 11 cannot twist, which would cause a change in the transfer of heat and thus in the characteristic curve.

The sensor ring 40 is adapted with its heat expansion coefficients to the heat expansion coefficients of the hot band 11, so that changes in length on the part of the hot band 11 or the sensor ring 40 caused by heat expansion result in virtually no tensile or compressive stresses in the hot band 11; instead, such stresses are substantially compensated for by alterations in the spacing between the support points 41, 42 and 43. The suspension of the hot band 11 in a manner free of tensile and compressive stresses is extraordinarily important if the hot band is intended for use as an air flow rate meter, for instance, in the intake tube of an internal combustion engine. The temperature range which must be taken into account in such an instance is generally from $-30°$ C. to $+120°$ C. There is also the temperature change dictated by the mode of operation of the hot band 11. The hot band is still further heated, as described, up to a high temperature in order to burn off deposits from its surface. Even this brief increase in temperature causes changes in length on the part of the band, which could cause tensile and compressive stresses if the band were held rigidly in place. The V-shaped disposition of the hot band 11 and the adaptation of the heat expansion coefficients of the sensor ring 40 and the hot band 11 substantially prevent the induction of tensile and compressive stresses into the hot band 11. In the case where the hot band 11 is made of platinum, the sensor ring 40 is efficiently made from a nickel-iron alloy whose heat expansion coefficient corresponds approximately to that of platinum. It is also possible to make the sensor ring of glass, especially platinum-glass. The heat expansion coefficient of glass of this kind corresponds substantially to that of platinum, so that tensile or compressive stresses resulting from temperature changes can substantially be prevented from affecting the hot band 11.

As is shown in FIG. 2, the support points 41, 42 and 43 extending parallel to one another may be bent in hook-like fashion. At least the terminal support points, which serve to furnish electric current, are secured in the sensor ring 40 in a manner which electrically insulates them from the sensor ring 40. The middle portion of the hot band 11, which is guided about the support point 43, forms a loop 44, while the portions of the hot band 11 leading away from the support point 43 are connected with one another in an electrically conductive manner, being welded or soldered together, for instance, at a contact region 45. There no longer occur difficulties usually associated with an indefinite convection of heat from the hot band 11 to the support point 43 when there are changes in length or displacements of the hot band 11 on the support point 43. It is also found insignificant, because of the particular manner of suspension of the hot band 11 on the support point 43, if the hot band should be lifted slightly up from the support point 43 or change its position or twist as a result of heat expansions.

Figure 3:
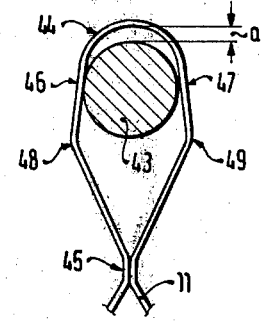
FIG. 3 shows in a cross-sectional view a loop-like embodiment of the hot band in the vicinity of a central support point.

It is particularly advantageous for the loop 44 intended for attaching the hot band 11 to be given the form shown in FIG. 3. In accordance with FIG. 3, the looping angle of the loop 44 is smaller than 180°. Furthermore, the shape of the loop is selected to be such that there is a sufficiently great distance between two contact points 46 and 47 for the loop 44 at the support point 43 and two points 48 and 49, from which the band portions of the loop 44 extend toward each other again and come together at the contact area 45. This distance assures that in the event of expansions on the part of the loop 44 or the hot band 11 there are no mechanical stresses induced in the hot band 11; in fact, free movability of the loop 44 on the support point 43 is assured, in accordance with the distance indicated by the letter a in the drawing.

Figure 4:
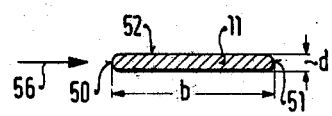
FIG. 4 is a cross sectional view taken through the hot band.

During operation, particles floating in the air come to land particularly on the face of the temperature-dependent resistor 11 exposed to the brunt of the air flow and there form deposits, which change the characteristic curve of the measuring sensor after only a short period of operation, thus causing incorrect measurements or even destroying the temperature-dependent resistor. The temperature-dependent resistor 11 is accordingly embodied in the form of a band, as is shown on a different scale in FIG. 4, having by way of example an oblong cross-section whose narrower faces 50, 51 take the form of a semicircle. The narrower faces 50, 51 may equally well be embodied as conical in form. The thickness d of the narrow faces 50, 51 is small in proportion to the width b of the long faces 52 of the hot band 11. In a special instance, the ratio of d:b is 1:10, with the actual dimensions being 0.02 mm:0.2 mm. Now in order to keep the tendency of the hot band to become soiled as low as possible, the hot band is guided over the support points 41, 42, 43 in the sensor ring 40 in such a manner that one of the narrow faces 50, 51, and in the present instance specifically the narrow face 50, is disposed counter to the air flow direction 56 so that it acts as the exposed face, while the wide faces 52 extend substantially in the flow direction. As a result, the possibility of the sensor becoming soiled is so greatly reduced that long-term constancy of the measurement signal of the measuring sensor is assured, and destruction of the hot band can be prevented.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A device for measuring the mass of a flowing medium, comprising a temperature-dependent resistor disposed in the flowing medium and a control means for controlling the temperature and resistance of the temperature-dependent resistor in closed-loop fashion in accordance with the mass of the flowing medium, a control variable of the control means being a standard for the mass of the flowing medium, wherein:

said temperature-dependent resistor is embodied as a band having two wide faces and two narrow faces extending between opposite ends of the band;

the device further comprises a sensor ring having a plurality of band support points positioned there, the support points including two terminal support points and an intermediate support point located between the two terminal support points;

the band is disposed within the sensor ring and is guided from one end of the band to the other end of the band over the plurality of support points; and the guidance of the band is effected on the intermediate support point by a loop of the band, said band including portions extending away from the intermediate support point, and being connected in an electrically conductive manner with one another in a contact area of said band, the band being disposed in the flowing medium in such a manner that one of the narrow faces of the band performs as an exposed face disposed counter to the flow of the medium while the wide faces of the band extend substantially in the flow direction.

2. A device as defined by claim 1, wherein the electrically conductive connection of the band portions in the contact area of the loop is a welded connection.

3. A device as defined by claim 1, wherein a loop angle of the loop about said intermediate support point does not exceed 180° and there is a distance between the contact points of the loop on the intermediate support point and the points from which the band portions of the loop means come together again, which distance permits a stress-free expansion in length of the hot band or the loop.

4. A device as defined by claim 1, wherein the exposed face of the hot band disposed counter to the flow direction is embodied as semicircular.

5. A device as defined by claim 1, wherein said band is constructed of platinum.

6. A device as defined by claim 5, wherein said sensor ring is constructed of a nickel-iron alloy whose heat expansion coefficient corresponds approximately to that of platinum.

7. A device as defined by claim 5, wherein said sensor ring is constructed of platinum-glass whose heat expansion coefficient corresponds approximately to that of platinum.

8. A device as defined by claim 1, wherein the electrically conductive connection of the band portions in the contact area of the loop is a hard soldered connection.

9. A device as defined by claim 1, wherein the exposed face of the hot band disposed counter to the flow direction is embodied as semicircular.

* * * * *